United States Patent Office 3,347,615
Patented Oct. 17, 1967

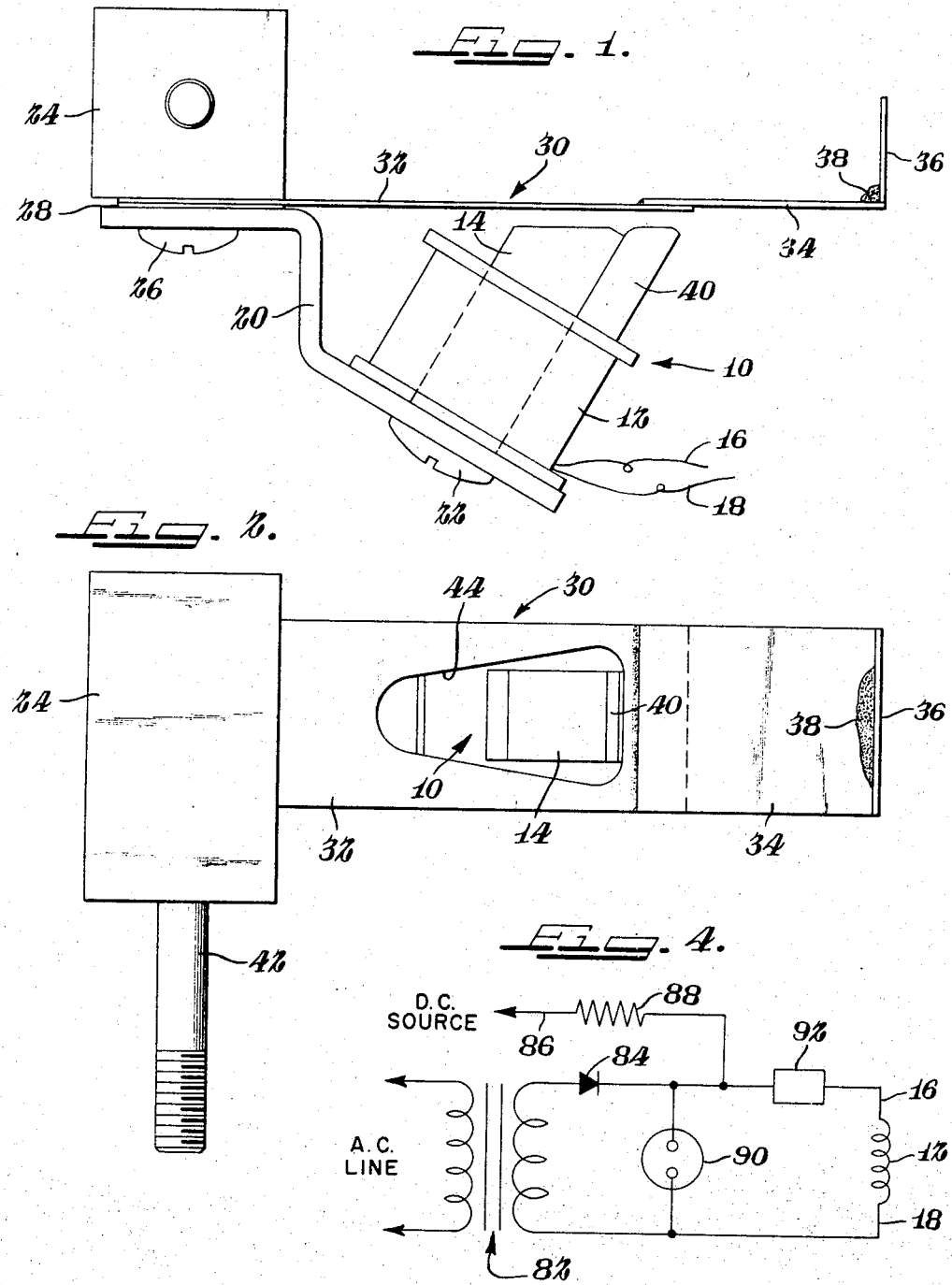

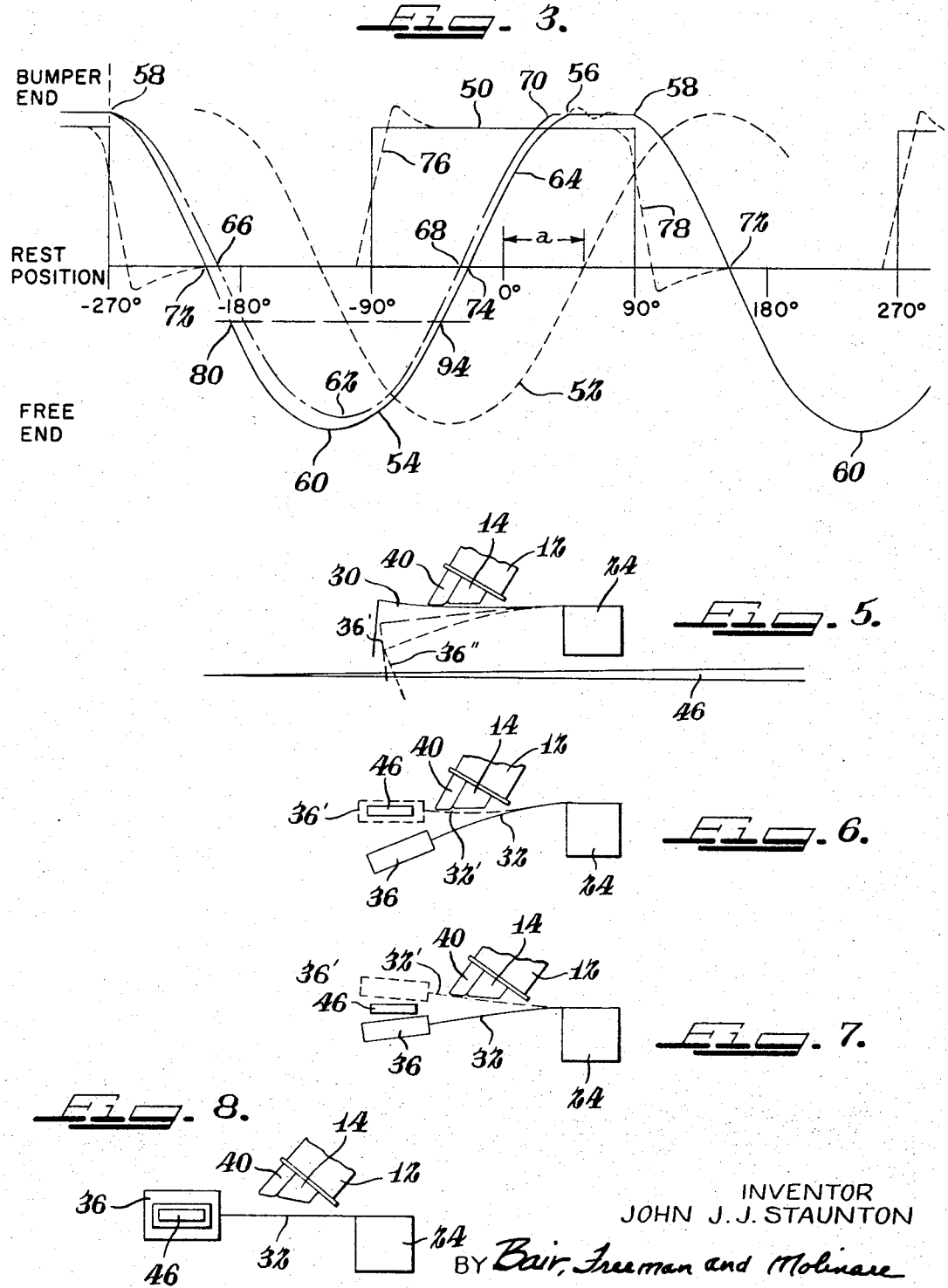

3,347,615
MECHANICALLY STABILIZED LIGHT CHOPPER
John J. J. Staunton, Oak Park, Ill., assignor to Coleman Instruments Corporation, a corporation of Delaware
Filed Apr. 15, 1964, Ser. No. 359,900
12 Claims. (Cl. 350—269)

ABSTRACT OF THE DISCLOSURE

A mechanical light modulator in which a resilient, light-chopping reed is vibrated by a periodically energized solenoid. A resilient bumper is positioned to intercept the moving reed as it is attracted by the energized solenoid. The bumper dissipates the kinetic energy of the reed and holds it captive until the solenoid is deenergized, whereupon the reed is released to make a single cyclic excursion from the bumper.

Background and summary of the invention

This invention relates generally to a new and improved light chopping assembly and more particularly to a novel mechanically stabilized light chopper having a periodically energized solenoid in combination with a resilient bumper for stabilizing the starting position and phase of a moving reed while dissipating the excess excitation energy of each cycle.

In optical measuring instruments employing a photometric system as the terminal measuring device, it is common practice to chop or modulate the light beam to be measured. Such light chopping may be used to provide more rapid and accurate functioning of the photometric sensing device, as in the case of photoconductive cells where temporal drifts vitiate the measurement if unmodulated light is used, or it may be used to eliminate the dark current of a photo-emissive device from the reading. In other cases, light chopping may be used to limit the response of the photometer only to the frequency of the chopped light beam, causing it to ignore ambient or stray light outside of this frequency range.

Those skilled in the art appreciate that while it sometimes is desirable to use a light source that is modulated at the desired frequency, this is not always practical. Hence, light choppers that function to interrupt the light beam periodically at the proper frequency have become an important and widely used component of optical measuring systems.

Light chopping devices of the prior art generally have taken the form of a rotating disc with multiple teeth or apertures, a rotating slotted or apertured cylinder, a light valve or a vibrating tuned reed. While the rotating disc or cylinder have certain advantages, they are relatively expensive and noisy because of the sizeable motor required to drive such devices at a high rate of speed against considerable wind friction. The synchronous motor usually required to maintain the desired constant speed generates considerable noise and heat, and is subject to short time periodic speed fluctuations, or hunting, unless it is large and well damped.

Light valves and vibrating tuned reeds are smaller and lighter than the rotating choppers. This enables the optical measuring equipment, such as spectrophotometers, fluorimeters, flange photometers and the like, to be more readily fitted into the laboratory. In addition, the cost of manufacture is less, the likelihood of damage from transportation is minimized, and the instrument can be made more immune to environmental influences.

The light valve, which utilizes one or two thin current carrying ribbons movably positioned in a magnetic field, has not proved satisfactory in the instrument field due to its limited aperture and high cost. The vibrating reed, which is driven by a periodically energized solenoid to interrupt the light beam, is a more promising type of light chopper. It can be placed in constricted locations near focal points such as slits and in small, crowded optical systems which cannot accept a rotating disc or cylinder. Also, the vibrating reed consumes little power, generates little heat, and is not objectionably noisy.

However, previously known vibrating reed light choppers have not proved entirely satisfactory for use in optical measurement apparatus. Such prior art devices have utilized a freely vibrating reed in which the amplitude or total excursion at its free end increases to a maximum dependent on several major factors, as strength of excitation, stiffness, accuracy of tuning, windage loss, energy loss through the clamped end, and damping, as well as several lesser factors. Some of these are influenced significantly by ambient temperature, or by the age and fatigue status of the reed. As a result, the amplitude of reed vibration, and hence the waveshape of the intensity curve of the light beam modulated by a blade fixed to the end of the reed, would not be constant unless all of these factors could be controlled or some other means of maintaining a constant amplitude be used.

It is a general object of this invention to provide a new and improved light chopping assembly which overcomes the disadvantages of the above-described prior art light choppers.

It is a more particular object of this invention to provide a unique mechanically stabilized light chopper having a periodically energized solenoid in combination with a resilient bumper for stabilizing the starting position and phase of a moving reed while dissipating the excess excitation energy of each cycle.

It is another object of this invention to provide such a mechanically stabilized light chopper having a periodically energized solenoid in combination with a resilient bumper for controlling the movement of a flexible reed that operates as a captive member which is released periodically to make a single cyclic excursion from the solenoid and then is recaptured when the next current pulse energizes the solenoid.

It is still another object of this invention to provide a novel mechanically stabilized light chopper which has high phase stability, low sensitivity to excitation changes and is unaffected by temperature changes.

It is a further object of this invention to provide a novel embodiment of the inventive mechanically stabilized light chopper which is capable of chopping a light beam at twice the frequency of the exciting current pulses.

It is a still further object of this invention to provide a compact and highly durable light chopping assembly which combines the amplitude stability of a low amplitude, non-resonant contact-banked reed with the high Q characteristics of a free resonant reed to secure the high amplitude and stability characteristics required in a satisfactory light chopper.

It is still another object of this invention to provide a fast self starting light chopper which is characterized by its relatively low excitation power requirement and sound output, as well as by its flexibility of application and freedom from periodic maintenance or lubrication requirements.

The novel features which are characteristic of the invention are set forth with particularly in the appended claims. The invention itself, however, both as to its organization and method of operation together with further objects and advantages thereof, will best be understood by reference to the following description taken in conjunction with the accompanying drawing.

*Brief description*

FIGURE 1 is an elevational view of one illustrative embodiment of light chopper utilizing the principles of the invention;

FIGURE 2 is a plan view of the invention embodiment of FIGURE 1;

FIGURE 3 is a waveform diagram illustrating the phase characteristics of the reed and chopped light;

FIGURE 4 is an electrical schematic diagram of one type of excitation circuit suitable for use with the invention:

FIGURE 5 is a drawing illustrating one type of light chopping action where the reed axis is parallel to the light beam;

FIGURE 6 is a drawing illustrating another type of light chopping action where the reed axis is perpendicular to the light beam; and FIGURES 7 and 8 illustrate two different embodiments of light chopper assemblies capable of chopping the light beam at twice the frequency of the exciting current.

*Description of the preferred embodiments*

Referring now to the drawing, and more particularly to FIGURES 1 and 2 thereof, there is illustrated a typical embodiment of a light chopping assembly utilizing the principles of the present invention. In accordance with this particular embodiment, there is provided an electrically energizable solenoid 10 comprised of the coil 12 and soft iron core 14. The coil 12 includes a pair of conductors 16 and 18 for connection to a source of cyclically pulsating current for energizing the solenoid 10 at a substantially constant frequency rate.

Advantageously, the solenoid 10 is supported by a soft steel yoke or bracket 20 and is firmly secured to the yoke 20 as by means of the screw 22. The yoke 20, in turn, is secured by means of the screw 26 to a heavy mass element such as the bracket or post 24. By means of a suitable spacer 28, to give an even distribution of clamping action, a flexible reed 30 is also tightly clamped to the heavy bracket or post 24. As particularly shown in FIGURE 1 of the drawing, the yoke 20 has an end portion angularly disposed with respect to the elongated reed 30 such that the coil 12 and core 14 of the solenoid 10, supported on the yoke 20, also are angularly positioned relative to the elongated reed 30. Those skilled in the art also will appreciate from FIGURE 1 that the light chopper is assembled such that the elongated reed 30 is positioned within the electro-magnetic field of the solenoid 10 so as to be moved in response to the electrical energization of the latter, as described in greater detail hereinbelow.

As particularly illustrated in FIGURES 1 and 2 of the drawing, the elongated reed 30 advantageously may be formed of a magnetic portion 32, which preferably may be formed of spring steel, and a nonmagnetic extension 34, which preferably may be formed of stainless steel or the like. Although in this embodiment, the extension 34 is welded to the magnetic portion 32 of the elongated reed 30 to form a unitary assembly, it will be appreciated that the entire reed 30 may be made of a single piece construction if desired. It also will be appreciated that the reed itself may serve to interrupt or chop the light beam, or if desired, the light beam may be interrupted by a blade 36 formed by bending up the end of the extension 34 at right angles to the longitudinal axis of the reed.

In practice, the light chopper is mounted on the rigid cast optical bench of the measuring instrument by means of the threaded stud 43. It is highly desirable for proper operation that this mounting be made to a body of sufficient mass to effectively resist the tendency of the light chopper to impart motion to the body upon which it is mounted. Those skilled in the art will appreciate that if this precaution is not taken, energy may be transferred from the light chopper to the body on which it is mounted, and the action of the light chopper will be impaired.

When the light chopper is periodically energized by connecting a source of periodic current pulses to the solenoid coil 12 through the leads 16 and 18, the elongated reed 30 will be attracted towards the soft iron core 14 of the solenoid. It is preferable that the reed 30 be flexible and towards this end, a suitable material such as spring steel has been found quite satisfactory for the reed. In addition, if desired, the flexibility of the elongated reed 30 may be enhanced by the provision of an aperture 44, shown in FIGURE 2, at the central portion of the reed.

During the manufacture of the flexible reed 30, its natural frequency may be adjusted after assembly by loading the reed with solder 38 at its free end portion between the blade 36 and the extension 34. Those skilled in the art will appreciate that by the proper adjustment of the amount of solder 38, the natural frequency of the reed may be accurately adjusted to provide the optimum starting and stable operation. For example, with an energization source consisting of square pulses at a frequency of 60 per second, it has been found that the natural frequency of the reed may be accurately adjusted by the solder 38 to a frequency of between 60.0 and 60.2 cycles per second. A reed so tuned builds up amplitude rapidly when first energized until the reed begins to bank against a resilient bumper 40 at the end of each energization cycle. As particularly shown in FIGURES 1 and 2, it is a highly novel feature of the present invention to provide a resilient bumper 40 adjacent the soft iron core 14 of the solenoid 10 such that the movement of the reed 30 towards the solenoid will cause the reed to bank against the bumper 40 at the end of the cycle. Up to this time, the phase of the reed 30, defined as the time of greatest excursion toward the core 14, has been lagging behind the phase of the magnetic field pulse of the coil 12. When banking takes place, the phase of the reed 30 advances abruptly, oscillates two or three times about a mean value, and then settles down to a stable condition. This advance in phase and the consequent stable operation is an essential feature of the present invention and now will be discussed in detail with particular reference to FIGURE 3 of the drawing.

Those skilled in the art will appreciate that if the reed 30 were free and the bumper 40 not present, the reed would vibrate in a simple harmonic motion. The pulsating magnetic field would deliver energy to the reed and increase its amplitude of swing until the losses by windage, magnetic and mechanical hysteresis, mechanical transfer of energy to the support, etc., were equal to the energy supplied. The stiffness of the reed also would be a controlling factor. Since the latter characteristic, as well as some of the losses, is dependent on ambient temperature, the amplitude of swing would not be a constant value. Furthermore, the accuracy of tuning would affect the efficiency of energy transfer considerably and, consequently, will also affect the amplitude of swing.

A simplified representation of the phase relationships associated with reed vibration is illustrated in FIGURE 3 of the drawing. Here a pulsating square wave energization 50 graphically represents the periodically varying electrical energizing pulse to the solenoid. The zero phase is arbitrarily taken at the mid point of this pulse as shown in FIGURE 3. The dotted line 52 represents the position of the end of the reed as it vibrates, with the upwards direction on the drawing taken as that in which the reed approaches the solenoid core 14 and resilient bumper 40.

Those skilled in the art will appreciate that if the reed 30, having no losses its excursion would cross the zero line at the zero degree point. In other words, the phase of the reed 30 would lag 90° behind that of the exciting signal pulse 50. Because of the losses, however, the lag increases so that the crossing or zero intercept occurs at an angle $a$ lagging behind the no-loss or zero intercept point. Since the angle $a$ is a function of the losses, and since these are not constant from time to time, the angle $a$ also will vary. In other words, the phase of the free reed is not constant, nor, as has been shown, is its amplitude.

Because of this inconstency of phase and amplitude, a free reed is not suitable for use as a light chopper in a photometric measuring system, as the phase of the resulting chopped light signal will not be constant and neither will its amplitude be maintained constant. Accordingly, it will be obvious to those skilled in the art that a signal that is neither constant in phase nor amplitude is not readily and accurately measurable.

Because the losses cause a free reed to lag behind the driving energization signal pulse, it would seem that the additional losses associated with the banking of the reed 30 against the resilient bumper 40 would cause an increase in lag. However, it is a feature of this invention that this is not the case and in fact the addition of the bumper 40 causes the phase of the reed 30 to shift abruptly in the leading direction and to take a stable value, as indicated in FIGURE 3. This change occurs when the amplitude builds up enough on starting to reach the bumper 40 and is actually audible in the use of the present invention. Observed on an oscilloscope, the initial lagging phase rapidly shifts in the direction of lead and snaps into its stable running position.

In accordance with an important feature in the present invention, this dramatic change in operation is due to the fact that the reed is no longer being operated as a resonant harmonic oscillator as would be the case of a free vibrating reed. Rather, in the present invention, the elongated reed 30 is operating as a captive device which is released periodically from the solenoid and bumper to make a single cyclic excursion and then is recaptured when the next current pulse energizes the solenoid. Referring to the waveform diagram of FIGURE 3 during the time between the points 56 and 58, the reed 30 is being held captive against the bumper 40 by the attraction of the solenoid coil 12, which is energized by the square wave pulse 50. At the time illustrated by the point 58, the current pulse excitation ceases, and the reed 30 is released. It then accelerates along the path defined by the points 58, 54, and 56 on the FIGURE 3 curve. Since the reed has been tuned to a resonant frequency which is the same, or slightly higher, as the frequency of excitation, the reed will reach the extreme of its swing, point 60 on the curve, at a time which is the same or only slightly in advance of the onset of the next excitation pulse 50.

It will be appreciated that up to this time the reed has been free during its swing. Therefore, it follows that since the reed starts from a fixed position, it will swing to the same distance at the other side of center. Hence, the amplitude of swing is fixed at twice the distance of the bumper from the center or rest position. Consequently, unlike the free vibrating reed, the banking reed of the present invention tends to operate at constant amplitude. As explained in greater detail hereinbelow, the effect of losses on this basic constant amplitude operation is small, and in many cases self-compensating.

When the reed reaches the extreme of its other position, shown as the point 60 on the FIGURE 3 curve, excitation is not present and therefore does not have any effect on the phase or amplitude of the reed swing. As the reed starts back from the outermost position, point 60, towards the bumper position, point 56 on the FIGURE 3 curve, the excitation pulse begins and the attraction of a solenoid coil 12 helps to accelerate the movement of the reed towards the solenoid. At first, this magnetic attraction is small because of the distance of the reed from the pole piece of the solenoid. Most of the energy transfer to the reed to make up the losses takes place in the latter part of the swing, as illustrated from the points 64 to 56 on the FIGURE 3 curve. This highly important circumstance results from the intentional placement of the solenoid pole piece 14 at a position corresponding to the end of the reed swing. Its primary advantage is that the variation of the intensity of the attracting pulse will have a reduced effect on the part of the swing from the points 60 to 64 on the FIGURE 3 curve, and hence a relatively small effect on the phase of the swing.

When the reed 30 hits the resilient bumper 40 it has an excess of kinetic energy. Instead of increasing its amplitude, this excess of kinetic energy is dissipated in the resilient bumper 40 in the form of heat. As such, the bumper 40 should have a suitably high damping coefficient. It has been found in actual practice that a high grade virgin cork, cut so that its grain or internal tubular channels lie parallel to the face of the reed, is highly efficient for this purpose. This material has adequate damping ability to bring the reed to rest during the time from the points 56 to 58 on the FIGURE 3 curve, somewhat as suggested by the dotted damped wave superimposed, but not to scale, on the line between points 56 and 58. Further, the bumper material is soft enough so that the impact noise of the reed is not objectionable; however, it is not so soft that the location of the point 58 varies with the changes in the electromagnetic pull on the reed.

Those skilled in the art will appreciate that the invention is not limited to the use of cork for the resilient bumper material, and that this material has been specified above merely for purposes of illustration. Other types of resilient materials which may be used for the resilient bumper 40 include neoprene-cork composition, soft rubber, certain plastics, and even metal springs although they are somewhat noisier than the aforementioned materials. Regardless of the material used for the resilient bumper 40, it now will be appreciated by those skilled in the art that it is a salient feature of the present invention to use a resilient bumper to stabilize the starting position and phase of the reed while dissipating the excess excitation energy of each cycle, with each cycle being a separate event and not a culmination of a series of periodic events as in the case of a free vibrating reed.

It has been found that good results are obtained when the periodic excitation pulses are controlled, since the time from the points 64 to 56 on the FIGURE 3 curve is finite and an increase in excitation will produce some shift towards leading phase. It has been found that a waveform produced by rectifying a 60 cycle sine wave, and then clipping it by shunting a gas diode across the output, gives good preliminary stabilization. This stabilization can be made substantially perfect by adding a few percent of uncontrolled D.C. to compensate for the residual variation of the diode.

One type of excitation circuit suitable for use with the present invention is shown in basic form in FIGURE 4 of the drawing. As there shown, a transformer 82 converts the uncontrolled A.C. line voltage to a suitable voltage substantially greater than the striking voltage of the gas diode 90, which is used as a clipper in this circuit. The rectifier 84 gives half wave rectification to provide the proper pulse frequency and to provide proper spacing between the pulses. The operating voltage of diode 90 establishes the top or plateau value of the pulse. The base value normally would be zero, but in accordance with the feature of this invention, a D.C. bias is provided by the conductor 86 through the resistor 88 and the resistor 88 is adjusted to a value whereby the bias variations with line voltage changes will raise or lower the base of the pulse the same amount as the residual plateau variation and thereby maintain the pulse height constant. The pulse output is fed to the solenoid coil 12 of the chopper through a suitable phase shifting and voltage adjusting circuit 92.

When the driving circuit of FIGURE 4 is used, a further advantage results from the novel operation of the inventive light chopper. This advantage is an increased independence between phase and excitation levels, making the compensation just described less critical. This can be explained by further reference to FIGURE 3 where the essential form of the pulse generated by the circuit of FIGURE 4 is shown by the dotted lines 76 and 78. If the height of the pulse were to increase, the solenoid coil 12 would attract the reed more, and the reed would increase in acceleration in the region between the points 60 and 56 of its curve. This would shift this part of the curve towards the leading phase. However, because of the slope of the cut off side of the pulse 78, cut off would be delayed and shift the let-off point 58, and that part of the curve between points 58 and 60, towards lagging phase. With proper design, the respective leading and lagging shifts can be made to compensate each other so that the effective phase change with excitation variation is zero.

At this point, those skilled in the art will appreciate an additional and important advantage realized by using the vibrating reed type of chopper of the present invention. If it is assumed for purposes of illustration that the chopper is chopping a very narrow beam of light lying along the zero axis, it will be clear that at point 72 of the FIGURE 3 curve, the chopper blade will cut off the beam and at point 74 of the FIGURE 3 curve, the beam will go on again. The average phase of the signal produced in the photometric measuring circuit by the chopped beam will be the median between points 72 and 74. Hence, a shift of point 72 towards leading phase can be compensated exactly by a shift of point 74 towards lagging phase. Likewise, if the chopper is not exactly located with respect to the light beam so that the points 80 and 94 respectively become the on and off points, still no change in output phase will result although the percent modulation will be reduced. This important feature of the present invention is true also where a large nonuniform light beam is being chopped. This constancy in phase is unique to the vibrating chopper since, by retracing its path every other half cycle, it compensates its own phase. Those skilled in the art will appreciate that a rotating chopper does not have this particular advantage.

Not only does the phase of the inventive chopper show constancy with excitation, but it also is substantially constant with temperature. This may be understood by referring again to the waveform chart of FIGURE 3. While it is possible to achieve this temperature invariance by using a reed material whose elasticity does not vary with temperature, such as the alloy Elinvar, it also is possible to achieve the same highly desirable result in the present invention by the use of a much less expensive carbon steel for the reed 30. The stiffness of this material decreases as the temperature rises. Hence, on release, the reed accelerates more slowly, following the path illustrated by the points 58, 66 and 62 on the FIGURE 3 curve.

At the point 62, although it has not yet reached full amplitude, the excitation pulse is applied and causes the reed to be returned along the path illustrated by the FIGURE 3 curve points 62, 68 and 70. Because of the lower amplitude start and the lower stiffness, greater acceleration of the reed lies on the leading side of the path defined by the curve points 60, 74 and 56. Thus, the lag between the points 72 and 66 is compensated by the lead between the points 74 and 68. The loss in amplitude at point 62 is small, and has little effect on the chopped light beam in the actual use of the invention, the phase compensation being much more important.

In accordance with a further feature of this invention, the above described novel principles can be extended to the use of a second resilient bumper on the outer position or relaxed end of the reed's swing, shown as point 60 in the FIGURE 3 curve. Normally, those skilled in the art would expect little advantage to result from the use of a second resilient bumper but it has been found that the addition of a second exciting solenoid coil adjacent a second resilient bumper would result in operation following the teaching of the present invention to a somewhat greater degree than the single solenoid coil and bumper embodiment described above. Also, the use of a polarized armature on the reed, and such other well known variants on the relay driving system consistent with the teaching of the present invention all come within its scope and principles.

Those skilled in the art will appreciate that the reed 30 can be coupled to the beam 46 in a number of different ways within the scope of the invention. For example, FIGURE 5 illustrates one embodiment wherein the longitudinal axis of the elongated, flexible reed 30 is positioned adjacent the light beam 46 and approximately parallel thereto when the solenoid soil 12 is energized. When the solenoid is not energized, and the reed is at rest, the tip of the blade interrupts the light beam 46, as shown by the dashed line blade 36' in FIGURE 5. In this manner, when the reed 30 is banked against the resilient bumper 40, the light beam 46 is unobstructed or ON. At the other end of its swing, the blade 36' interrupts the beam to its OFF condition.

Still another illustrative embodiment is shown in FIGURE 6 of the drawing. As there shown, the elongated reed is positioned with its flexible portion 32 perpendicular to the beam 46, rather than parallel thereto as in FIGURE 5. In this embodiment, a blade 36 of different shape is used to chop the light beam 46, with the longitudinal axis of blade 36 being an extension of the longitudinal axis of the reed portion 32 such that the blade 36 is perpendicular to the light beam. When the solenoid coil 12 is energized, the reed 32' is banked against the resilient bumper 40 to cause the blade 36' to intercept the light beam 46, as shown in dashed lines in FIGURE 6. When the solenoid is not energized, the blade 36 is swung away from the light beam so that the matter is ON. Manifestly, the components of the inventive combination can be arranged to cause the light beam to be turned either ON or OFF when the reed is banking, as desired.

In accordance with a further feature of the invention, the light chopper may be arranged to chop the light beam at a frequency twice that of the reed movement. Two such arrangements are illustrated in FIGURES 7 and 8 of the drawing.

In FIGURE 7, the narrow blade 36 turns the light beam 46 OFF as it passes through the center of its swing, and turns the beam ON at both ends of the swing. Thus, the light beam 46 is ON when the blade is at the banked end of the swing 36' and when it is at the free end of the swing 36.

Alternatively, as shown in FIGURE 8, the blade 36 may be provided with a central aperture, sufficiently large to permit the light beam 46 to be transmitted therethrough, even when the blade is in the center swing position, as illustrated. As the blade swings from the banked position to the free position, the back, the light beam is chopped twice for each cycle of the reed. It will be appreciated that the apertured blade arrangement of FIGURE 8 chops the light beam in the inverse phase to the arrangement of FIGURE 7.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a mechanically stabilized light chopper comprising the combination of an electrically energizable solenoid, a source of cyclically pulsating current for energizing said solenoid at a substantially constant frequency rate, an elongated, at least partially magnetic reed positioned within the electromagnetic field of said solenoid, one end of said reed being fixed relative to said solenoid and the other end being free for movement relative to said solenoid at its energizing frequency rate, light chopping blade means at the free end of said reed for periodically interrupting a light beam transmitted through the path of movement of said blade means, and resilient bumper means positioned adjacent the solenoid for stabilizing the starting position and phase of the resilient reed while dissipating the excess excitation energy during each cyclic movement of the reed, the periodic energization of the solenoid by the current pulses causing the reed to bank against said resilient bumper means until the end of the current pulse whereby said reed operates as a captive member which is released periodically to make a single cyclic excursion from said solenoid and then is recaptured when the next current pulse energizes the solenoid.

2. The improvement of a mechanically stabilized light chopper in accordance with claim 1 wherein said bumper is made of cork.

3. The improvement of a mechanically stabilized light chopper comprising the combination of an electrically energizable solenoid, a source of cyclically pulsating current for energizing said solenoid at a substantially constant frequency rate, an elongated, at least partially magnetic reed positioned within the electromagnetic field of said solenoid, one end of said reed being fixed relative to said solenoid and the other end being free for movement relative to said solenoid at its energizing frequency rate, said reed being provided with an aperture for enhancing its flexibility of movement, light chopping blade means at the free end of said reed for periodically interrupting a light beam transmitted through the path of movement of said blade means, and resilient bumper means positioned adjacent said reed and said solenoid, the energization of the solenoid by the current pulses causing the reed to bank periodically against said resilient bumper means whereby said reed operates as a captive member which is realsed periodically to make a single cyclic excursion during each solenoid energization period.

4. The improvement of a mechanically stabilized light chopper comprising the combination of an electrically energizable solenoid, a source of cyclically pulsating current for energizing said solenoid at a substantially constant frequency rate, an elongated, at least partially magnetic reed positioned within the electromagnetic field of said solenoid, one end of said reed being fixed relative to said solenoid and the other end being free for movement relative to said solenoid at its energizing frequency rate, light chopping blade means at the free end of said reed for periodically interrupting a light beam transmitted through the path of movement of said blade means, and resilient bumper means positioned adjacent said reed and said solenoid, the cyclical energization of the solenoid by the current pulses causing the reed to bank periodically against said resilient bumper means whereby said reed operates as a captive member which makes a single cyclic excursion during each solenoid energization period.

5. The improvement of a mechanically stabilized light chopper comprising the combination of an electrically energizable solenoid including a coil and a soft iron core, a source of cyclically pulsating current for energizing said solenoid coil at a substantially constant frequency rate, an elongated, at least partially magnetic reed positioned within the electromagnetic field of said solenoid, one end of said reed being fixed relative to said solenoid and the other end being free for movement relative to said solenoid at its energizing frequency rate, the longitudinal axis of said solenoid coil being angularly positioned relative to the longitudinal axis of said reed, light chopping blade means at the free end of said reed for periodically interrupting a light beam transmitted through the path of movement of said blade means, and resilient bumper means positioned adjacent said reed and said solenoid, the periodic energization of the solenoid by the current pulses causing the reed to bank against said resilient bumper means until the end of the current pulse whereby said reed operates as a captive member which is released periodically to make a single cyclic excursion from said solenoid and then is recaptured when the next current pulse energizes the solenoid.

6. The improvement of a mechanically stabilized light chopper comprising the combination of an electrically energizable solenoid, said solenoid comprising a coil and a soft iron core, a source of cyclically pulsating current for energizing said solenoid coil at a substantially constant frequency rate, an elongated, at least partially magnetic reed positioned within the electromagnetic field of said solenoid coil, one end of said reed being fixed relative to said solenoid and the other end being free for movement relative to said solenoid at its energizing frequency rate, light chopping blade means at the free end of said reed for periodically interrupting a light beam transmitted through the path of movement of said blade means, and resilient bumper means positioned adjacent said soft iron core, the periodic energization of the solenoid coil by the current pulses causing the reed to bank against said resilient bumper means until the end of the current pulse whereby said reed operates as a captive member which is released periodically to make a single cyclic excursion from said solenoid and then is recaptured when the next current pulse energizes the solenoid.

7. The improvement of a mechanically stabilized light chopper assembly comprising the combination of an electrically energizable solenoid, a source of cyclically pulsating current for energizing said solenoid at a substantially constant frequency rate, an elongated, at least partially magnetic reed positioned within the electromagnetic field of said solenoid, one end of said reed being fixed relative to said solenoid and the other end being free for movement relative to said solenoid at its energizing frequency rate, said fixed end of said reed being secured to a heavy mass member to resist vibratory movement of the chopper assembly, light chopping blade means at the free end of said reed for periodically interrupting a light beam transmitted through the path of movement of said blade means, and resilient bumper means positioned adjacent the solenoid for stabilizing the starting position and phase of the resilient reed while dissipating the excess excitation energy during each cyclic movement of the reed, the periodic energization of the solenoid by the current pulses causing the reed to bank against said resilient bumper means until the end of the current pulse whereby said reed operates as a captive member which is released periodically to make a single cyclic excursion from said solenoid and then is recaptured when the next current pulse energizes the solenoid.

8. The improvement of a mechanically stabilized light chopper assembly in accordance with claim 7 further comprising loading means affixed to said reed to preset the natural frequency of vibration of said reed at a desired value.

9. The improvement of a mechanically stabilized light chopper assembly in accordance with claim 7 wherein said reed is formed of a first portion, including its fixed end, made of a flexible magnetic material and a second portion, including its free end, securely connected to said first portion and made of a nonmagnetic material.

10. The improvement of a mechanically stablized light chopper assembly in accordance with claim 7 wherein said reed is positioned so that its longitudinal axis is parallel to said light beam and said blade means is perpendicular to said light beam.

11. The improvement of a mechanically stabilized light chopper assembly in accordance with claim 7 wherein said reed is positioned so that its longitudinal axis is perpendicular to said light beam and the blade has its longitudinal axis in alignment with the longitudinal axis of said reed.

12. The improvement of a mechanically stabilized light chopper assembly in accordance with claim 7 wherein said light chopping blade means is apertured to form a closed opaque loop which serves to chop the light beam at a frequency twice the frequency of the energizing current pulses to the solenoid.

References Cited

UNITED STATES PATENTS

| | | | |
|---|---|---|---|
| 2,553,171 | 5/1951 | De Lima Campos | 88—61 |
| 2,934,647 | 4/1960 | Blake | 250—232 |
| 3,005,374 | 10/1961 | Thomas | 88—61 |
| 3,265,839 | 8/1966 | Johnson | 200—122 |

WALTER STOLWEIN, *Primary Examiner.*